US008671826B2

(12) United States Patent
Smit

(10) Patent No.: US 8,671,826 B2
(45) Date of Patent: Mar. 18, 2014

(54) BREW THROUGH LID, ASSEMBLY OF A THERMAL CARAFE AND A BREW THROUGH LID AS WELL AS A COFFEE MAKER INCLUDING SUCH AN ASSEMBLY

(75) Inventor: Gerard Clement Smit, Amerongen (NL)

(73) Assignee: Smitdesign B.V., Amerongen (NL)

( * ) Notice: Subject to any disclaimer, the term of this patent is extended or adjusted under 35 U.S.C. 154(b) by 1172 days.

(21) Appl. No.: 12/553,587

(22) Filed: Sep. 3, 2009

(65) Prior Publication Data

US 2011/0048241 A1    Mar. 3, 2011

(51) Int. Cl.
*A47J 31/44*    (2006.01)
(52) U.S. Cl.
USPC .................... 99/279; 99/285; 99/295; 99/299
(58) Field of Classification Search
USPC ................... 99/279, 288, 299, 304, 322, 323; 220/366
See application file for complete search history.

(56) References Cited

U.S. PATENT DOCUMENTS 5,497,892 A * 3/1996 Takatsuki et al. ............. 215/309
2002/0014161 A1 * 2/2002 Mork et al. ..................... 99/279

* cited by examiner

*Primary Examiner* — Brian Jennison
(74) *Attorney, Agent, or Firm* — Birch, Stewart, Kolasch & Birch, LLP

(57) ABSTRACT

A brew through lid for a thermal carafe that has a pouring provision and an internal liquid reservoir. The brew through lid has a cap member with a cone shaped cap top wall, a brew inlet in a center of the cap top wall at a lowest part of the cone shaped cap top wall, a substantially cylindrical connection wall having a top edge that is connected to the cap top wall and a lid connector that is an integral part of the connection wall. The brew through lid further has a pouring skirt wall that extends around an upper portion of the connection wall and defines a liquid space between the connection wall and the pouring skirt wall. A plurality of pouring passages is circumferentially spaced in the pouring skirt wall and that allow passage of brew liquid out of the liquid space. A plurality of connection wall passages that are circumferentially spaced in the cylindrical connection wall and is configured to allow passage of brew liquid from the internal liquid reservoir of the carafe to the liquid space.

14 Claims, 6 Drawing Sheets

BREW THROUGH LID, ASSEMBLY OF A THERMAL CARAFE AND A BREW THROUGH LID AS WELL AS A COFFEE MAKER INCLUDING SUCH AN ASSEMBLY

TECHNICAL FIELD

The disclosure relates to a brew through lid, an assembly of a thermal carafe and a brew through lid, and a coffee maker including such an assembly.

BACKGROUND

For automatic drip coffee makers it is known to use a thermal carafe with a brew through lid. Examples of brew through lids are shown in U.S. Pat. No. 4,924,922, U.S. Pat. No. 5,503,060, U.S. Pat. No. 5,653,362 and U.S. Pat. No. 5,699,719.

A drawback of the lids disclosed in U.S. Pat. No. '922, U.S. Pat. No. '362 and U.S. Pat. No. '719 is that they are rather complicated because they all include some kind of valve construction with moving parts for closing off a brew inlet. Such moving parts are easily soiled and, consequently, may loose their movability and brew liquid may not be able to enter the internal liquid reservoir of the carafe. For example U.S. Pat. No. '060 has a separate lid cover that is pivotally mounted on the top of the brew through lid. Also this construction is vulnerable and the possibility exists that a user forgets to open the lid cover before placing the thermal carafe in the coffeemaker.

Another disadvantage of the known lids is that they have to be partly unscrewed from the carafe in order to be able to pour brew liquid from the internal reservoir of the carafe via the pouring provision carafe. It may happen that the lid uncouples from the carafe when the user has unscrewed the lid too far. On the other hand when the lid has been unscrewed insufficiently, no or virtually no liquid will leave the internal liquid reservoir of the carafe. In order to solve this problem, markings on the lid may be present to help the user to bring the lid in the correct position for pouring brew liquid. The present disclosure is directed to alleviating one or more of the above described problems.

SUMMARY OF THE INVENTION

It is therefore an object to provide a brew through lid that is of simple construction, that is not vulnerable to soiling and that is simple to use in that brewing liquid may be poured out of the carafe on which the lid is positioned without any concern to the orientation of the lid relative to the carafe.

In one aspect a brew through lid is provided for a thermal carafe that has a pouring provision and an internal liquid reservoir with a height. The brew through lid comprises:
  a cap member, including:
    a cap top wall that is cone shaped and having a concave side that is directed upwardly;
    a brew inlet in a centre of the cap top wall at a lowest part of the cone shaped cap top wall;
    a substantially cylindrical connection wall having a top edge that is connected to the cap top wall;
    a lid connector that is an integral part of the connection wall;
  a pouring skirt wall that is connected to the cap member and that has a substantially cylindrical configuration, the pouring skirt wall extending around an upper portion of the connection wall and defining a liquid space between the connection wall and the pouring skirt wall, and
  a plurality of pouring passages that are circumferentially spaced in the pouring skirt wall and that allow passage of brew liquid out of the liquid space;
  a flange that circumferentially extends around the connection wall having an inner edge that is connected with the connection wall and having an outer edge that is connected with pouring skirt wall;
  a plurality of connection wall passages that are circumferentially spaced in the cylindrical connection wall and that are configured to allow passage of brew liquid from the internal liquid reservoir of the carafe to the liquid space.

By virtue of the cap top wall that is cone shaped and that has its concave side directed upwardly, brewing liquid that is produced by a coffee maker enters the internal liquid reservoir of the carafe, even if the carafe is not exactly positioned underneath the brew outlet of the brew basket of the coffee maker. By virtue of the plurality of pouring passages that are circumferentially spaced in the pouring skirt wall and the plurality of connection wall passages that are circumferentially spaced in the cylindrical connection wall, brew liquid may leave the reservoir when pouring in any rotational orientation of the brew through lid relative to the carafe. Even in the fully closed position of the brew through lid pouring of brew liquid out of the internal liquid reservoir of the thermal carafe is possible. This highly improves the ease of use of the brew through lid of the present invention relative to the known brew through lids.

In an embodiment the brew through lid may include a mixing pipe having a top edge that is connected to a downwardly directed side of the cap top wall, the mixing pipe defining a mixing pipe channel having an inlet that is constituted by the brew inlet and having an outlet at a downward end of the mixing pipe.

The mixing pipe provides the advantage that the brew liquid is mixed when entering the reservoir of the carafe. With conventional brew through lids, the brew in the reservoir of the carafe has a varying strength over the height in the reservoir. Strong brew is at the bottom of the reservoir and weak brew is in the top of the reservoir. By virtue of the mixing pipe, the brew in the reservoir has substantially the same strength at every point in the internal liquid reservoir.

In another aspect an assembly of a thermal carafe and a brew through lid is provided, the assembly comprising:
  a brew through lid as described above;
  a thermal carafe that includes:
    an internal liquid reservoir with a height
    an entrance opening that gives access to the internal liquid reservoir;
    a pouring provision;
    a carafe connector that is provided in the entrance opening and that is configured to co-operate with the lid connector to mount the brew through lid in the entrance opening.

With such an assembly the advantages that are described above in relation to the brew through lid are obtained as well. Although there is a direct connection between the internal liquid reservoir and the outside atmosphere via the plurality of pouring passages and the plurality of connection wall passages and via the brew inlet, tests with the embodiment having the mixing pipe have shown that the temperature of the brew liquid in the reservoir after one hour after the start of brewing cycle is equal or even higher then in the situation wherein no brew through lid is used but, instead, a conventional heat isolated lid that completely closes off the entrance opening is put on the thermal carafe after brewing. These tests have shown that the temperature decrease during the brewing cycle when no brew through lid is used is so considerable that the slightly better isolation of the internal reservoir after a conventional lid that completely closes off the reservoir has been placed on the carafe can not make up that initial temperature loss within one hour.

In yet another aspect a coffee maker is provided comprising:

a housing;

water reservoir that is included in the housing;

a brew basket that is connectable to or placeable on the housing and that has a brew outlet and is configured to hold a filter;

a conduit having an inlet opening that is connected to the water reservoir and having a outflow opening that is arranged above the brew basket;

a heating element that is arranged in the conduit at a level below the water reservoir; and an assembly of a thermal carafe and a brew through lid as described above of which a height is such that it can be positioned underneath the brew outlet of the brew basket.

Such a coffee maker is very easy to use. A user does not have to unscrew the brew through lid when coffee is brewed nor when he wants to pour the brew liquid out of the carafe. In other words, the carafe can be placed underneath the brew basket without any manipulation to the carafe. Next, when the brewing cycle has been finished, brewing liquid can be poured out of the carafe directly without any manipulation to the brew through lid or the carafe. Additionally, especially in the embodiment with the mixing pipe, the temperature of the brew liquid in the internal reservoir of the carafe is maintained at a level that is comparable or even better then in the situation wherein a conventional lid is placed on the internal carafe after finishing a brewing cycle.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
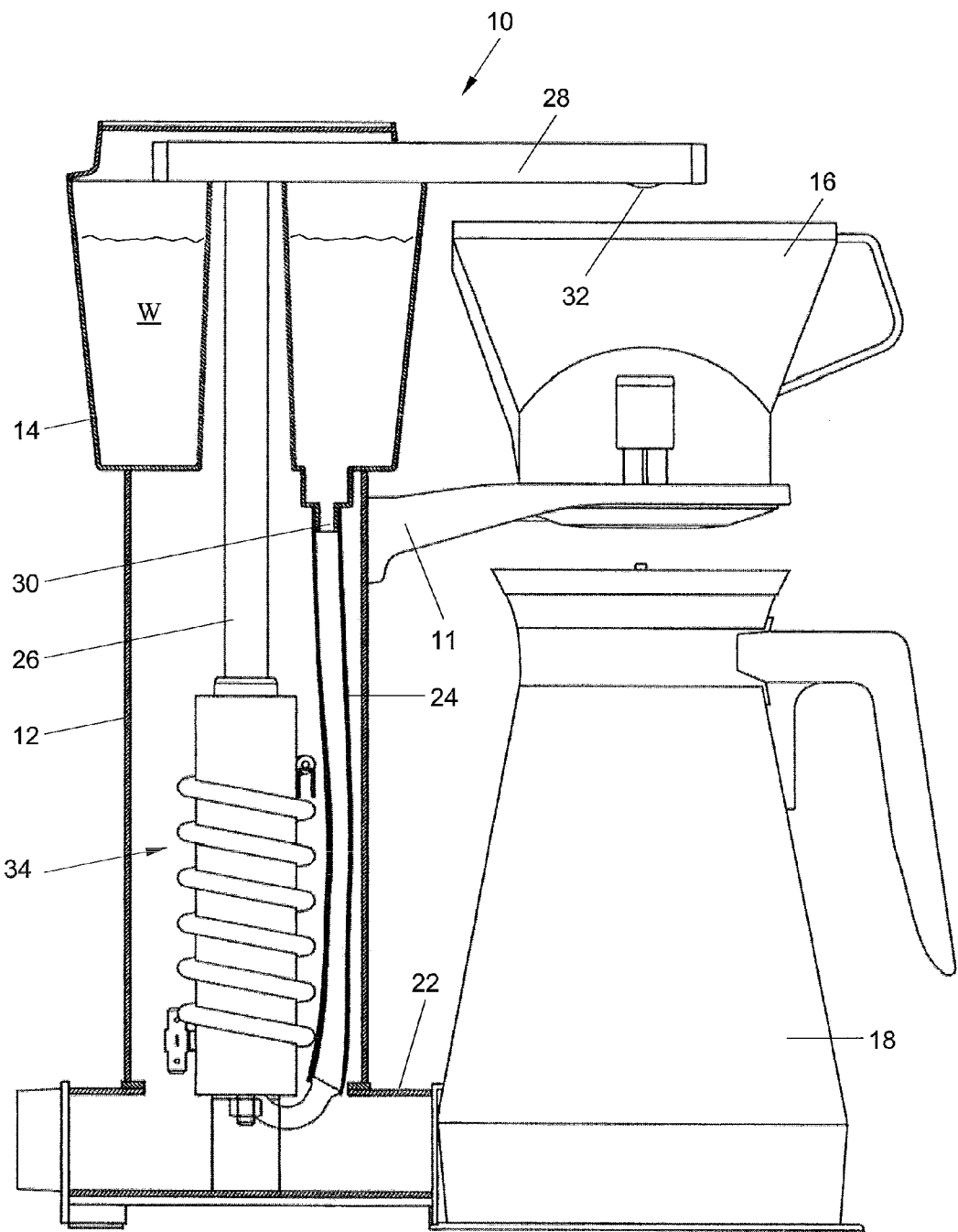
FIG. 1 shows a coffee maker in cross section.

FIG. 1 shows an example of a coffee maker 10. The coffee maker includes a housing 12 with a water reservoir 14 that is included in the housing 12. A brew basket 16 maybe connected to the housing 12r be placeable on a bracket 11 that may be a part of the housing 12. The brew basket 16 is configured to hold a filter. As is well known, the brew basket 16 has a brew outlet at the bottom thereof. In the present example, the brew basket 16 is placed on the bracket 11 of the housing 12f the coffee maker 10. A thermal carafe 18 is placed in or on a base part 22f the housing 12f the coffee maker 10.

In an alternative embodiment, the brew basket 16 may be pivotally connected along a vertical shaft to the housing 12f the coffee maker 10. A conduit 24, 26, 28 may be provided that has an inlet opening 30 that is connected to the water reservoir 14 at or near a bottom thereof. An outlet opening 32f the conduit 24, 26, 28 is arranged above the brew basket 16. A heating element 34 may be arranged in the conduit 24, 26, 28 at a level below the water reservoir 14. As is clearly shown, an assembly of a thermal carafe 18 and a brew through lid 20, which lid 20 is not visible in FIG. 1 but is clearly shown in the exploded view of FIG. 2 and the cross sectional view of FIG. 3, is positioned underneath the brew outlet of the brew basket 16.

During operation the user will fill the water reservoir 14 with water W. Consequently the conduit 24 and heating element 34 and a part of the conduit 26 will fill itself with water as well. Subsequently the coffee maker is switched on and the heating element 34 will heat the water that is inside the heating element 34. As a consequence, the water will start to boil and the air bubbles will push water out of conduit 26 via conduit 28 to the outflow opening 32. The heated water will thus enter the brew basket 16. The heated water will subsequently trickle through the coffee in the coffee filter in the brew basket 16 and leave the brew basket 16 via the brew outlet of the brew basket 16. This is all a very well known and does not have to be elucidated any further.

Figure 2:
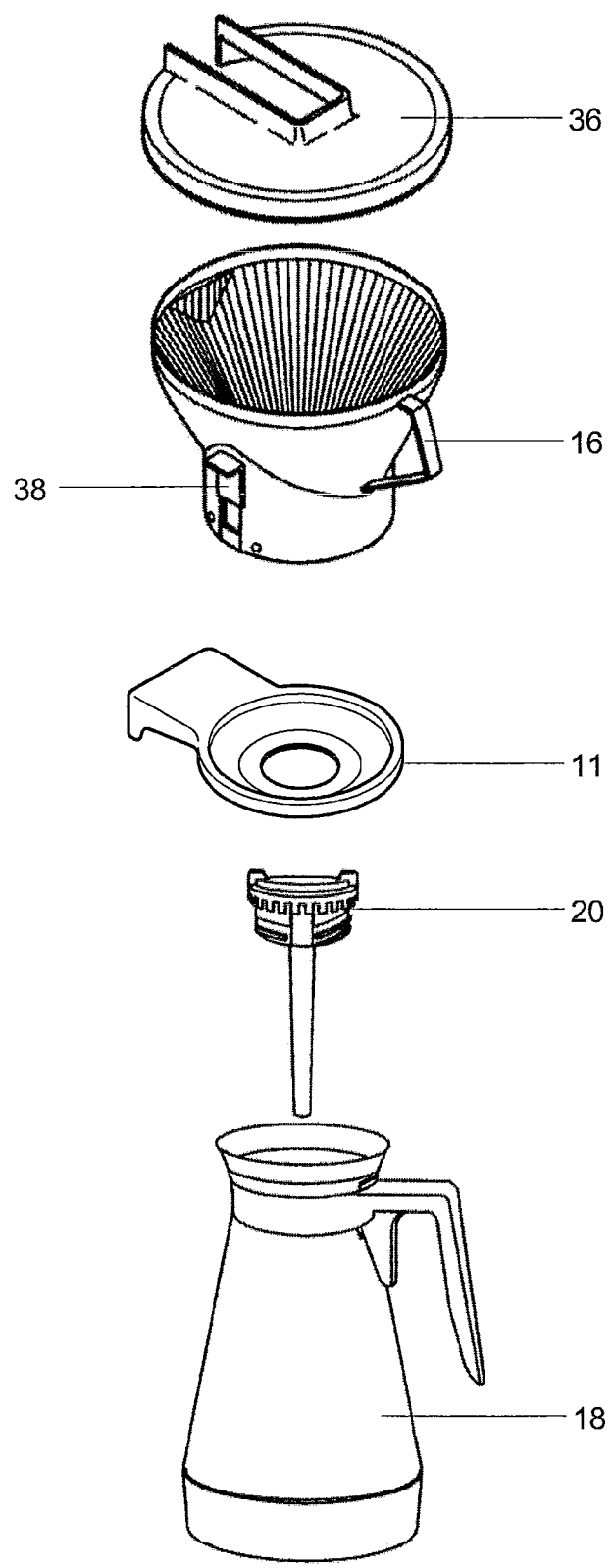
FIG. 2 shows an exploded view of a thermal carafe with an embodiment of the brew through lid, a brew basket and a bracket of a coffee maker.

FIG. 2 shows an exploded view of an embodiment of an assembly of a thermal carafe 18 and an embodiment of the brew through lid 20. Also shown is an example of a bracket 11 of the housing 12f the coffee maker 10 and of a brew basket 16 having a lid 36 to minimize cooling down of the water when it is in the brew basket 16. The brew basket 16 is in this embodiment also provided with a switch 38 with which the brew outlet of the brew basket 16 may be closed off.

Figure 3:
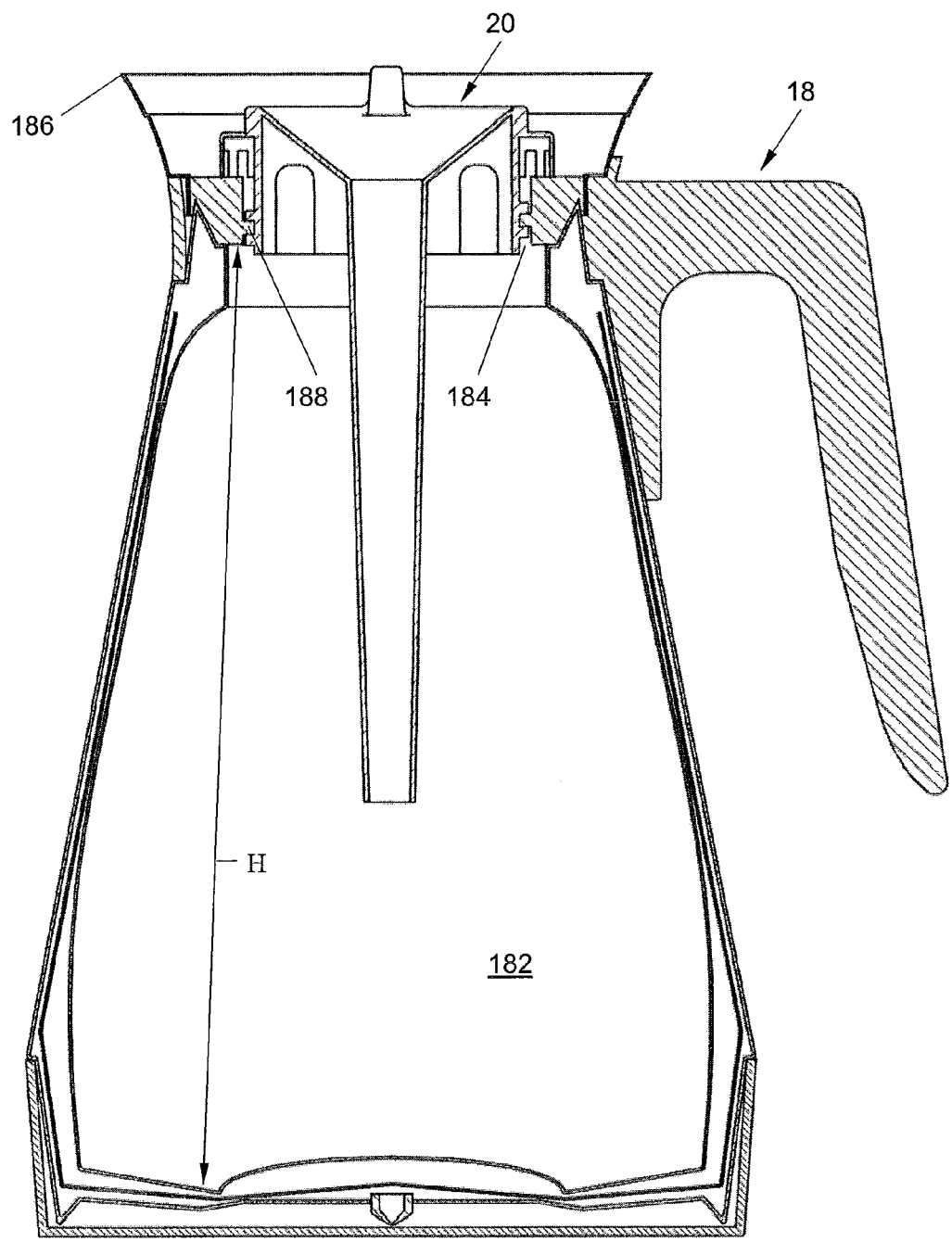
FIG. 3 shows a cross sectional view of an embodiment of the brew through lid that is mounted in a thermal carafe.

FIG. 3 shows an example of an embodiment of an assembly of a thermal carafe 18 and a brew through lid 20 in cross section. The thermal carafe includes an internal liquid reservoir 182 with a certain height H. An entrance opening 184 gives access to the internal liquid reservoir 182. The thermal carafe 18 further includes a pouring provision 186 via which brew liquid may be poured into a cup, a mug or the like. The pouring provision 186 may be embodied as a pouring spout or alternatively as a pouring edge. In the entrance opening 184 a carafe connector 188 may be provided that is configured to co-operate with a lid connector 50 to be described below. By co-operation of the lid connector 50 and the carafe connector 188 the brew through lid 20 may be mounted in the entrance opening 184. In one embodiment the carafe connector 188 may be an internal screw thread. In an alternative embodiment the carafe connector 188 may be a bayonet catch.

Figure 4:
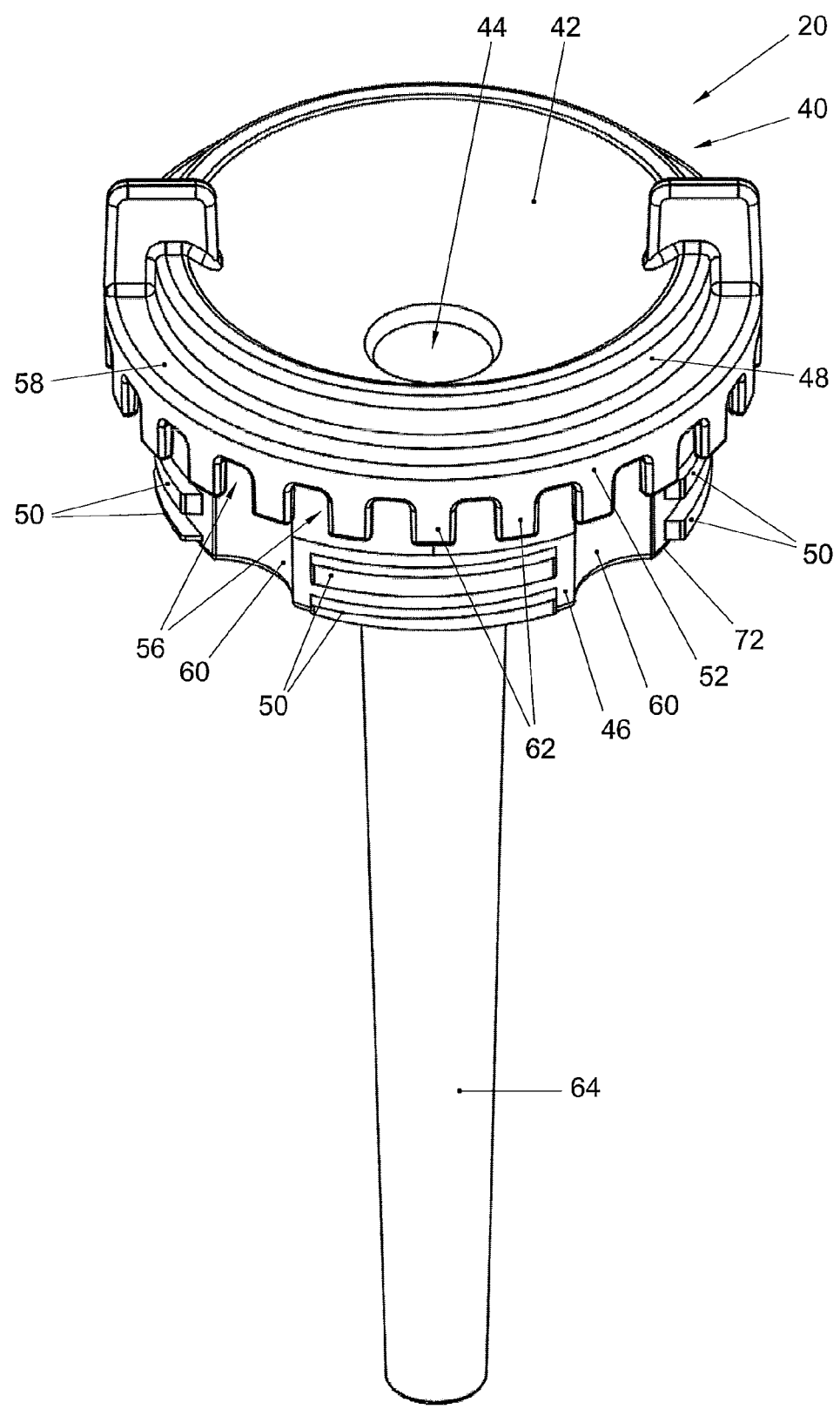
FIG. 4 shows a perspective view of the embodiment of FIG. 3 slightly from above.
Figure 5:
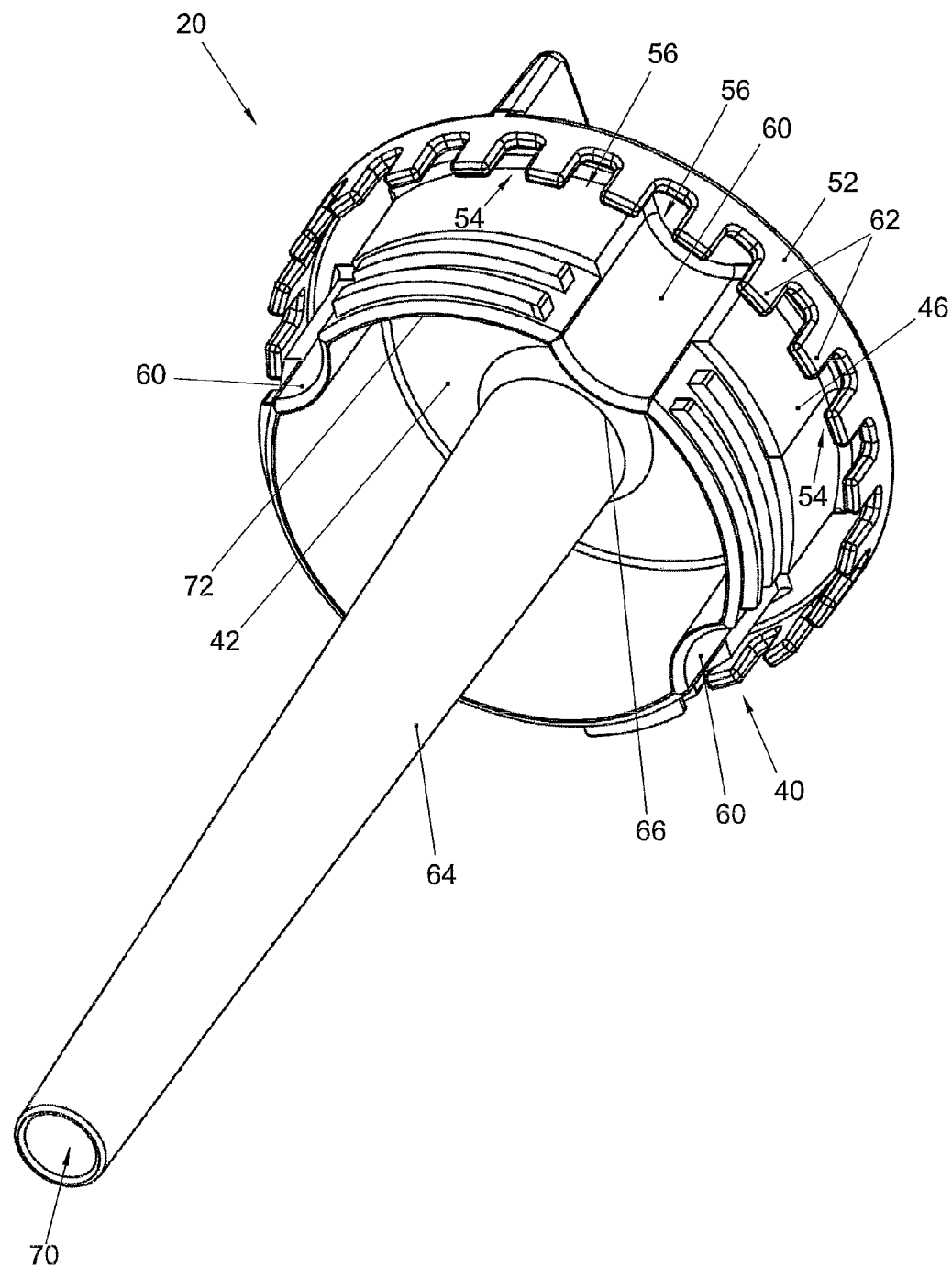
FIG. 5 shows a perspective view of the embodiment of FIG. 3 slightly from below.

Now turning to the brew through lid of which an embodiment is shown in perspective in FIGS. 4 and 5 and that is shown in cross section in FIG. 3 when placed in the thermal carafe 18. The shown example of an embodiment of the brew through lid 20 includes a cap member 40 having a cap top wall 42 that is cone shaped and that has a concave side that is directed upwardly. The cap member 40 has a brew inlet 44 that is present in the centre of the cap top wall 42 at a lowest part of the cone shaped cap top wall 42. The cap member 40 further has a substantially cylindrical connection wall 46 that has a top edge 48 that is connected to the cap top wall 42. The cap member 40 additionally includes a lid connector 50 that is an integral part of the connection wall 46 and that is configured to connect the brew through lid 20 with the carafe connector 188 of the thermal carafe 18. The brew through lid 20 further includes a pouring skirt wall 52 that is connected to the cap member 40 and that has a substantially cylindrical configuration. The pouring skirt wall 52 extends around an upper portion of the connection wall 46 and defines a liquid space 54 between the connection wall 46 and the pouring skirt wall 52. A plurality of pouring passages 56 are provided in the pouring skirt wall 52 in a circumferentially spaced manner. The plurality of pouring passages 56 allows passage of brew liquid out of the liquid space 54 when the brew through lid 20 is mounted in the entrance opening 184, so that brew liquid from the internal liquid reservoir 182f the thermal carafe 18 may be poured out of the thermal carafe 18 via these pouring passages 56. The brew through lid 20 further includes a flange 58 that circumferentially extends around the connection wall 46 and that has an inner edge that is connected with a connection wall 46 and an outer edge that is connected with the pouring skirt wall 52. Thus the flange 58 forms the connection between the pouring skirt wall 52 and the connection wall 46. The brew through lid 20 further includes a plurality of connection wall passages 60 that are circumferentially spaced in the cylindrical connection wall 46 and that are configured to allow passage of brew liquid from the internal liquid reservoir 182f the carafe 18 to the liquid space 54.

In an embodiment of the brew through lid 20, of which an example is shown in the figures, the circumferentially spaced pouring passages 56 may be formed by crenels of a downwardly directed crenellated structure in the pouring skirt wall 52. The neighbouring crenels are separated from each other by intermediate pouring skirt wall parts 62. Such a crenellated structure is advantageous from a manufacturing point of view because the structure may be easily released from a mould. This is in contrast to pouring passages that were embodied as circular holes in the pouring skirt wall 52.

In an embodiment of the brew through lid 20, of which an example is shown in FIGS. 3-5, the brew through lid 20 may include a mixing pipe 64 having a top edge 66 that is connected to a downwardly directed side of the cap top wall 42. The mixing pipe 64 defines a mixing pipe channel 68 having an inlet 44 that is constituted by the brew inlet 44 and having an outlet 70 at a downward end of the mixing pipe 64. In a preferred embodiment, the mixing pipe 64 has a length that is the range of 0.5-0.9 the height of the internal liquid reservoir 182. By virtue of the mixing pipe 64, brew liquid in the internal liquid reservoir 182 has the same concentration over the entire volume of the brew liquid in the reservoir 182. When no mixing pipe 64 is present, brew liquid, such as coffee, may have a weaker concentration at the top of the reservoir then at the bottom of the reservoir. Additionally, the mixing pipe 62 limits the liquid surface area of the brew liquid that is in direct contact with the outside air via the brew inlet 44. Thus cooling of the brew liquid in the internal liquid reservoir 182 via the brew inlet 44 is limited by virtue of the presence of the mixing pipe 64.

In an embodiment, of which an example is shown in the FIGS. 3-5, the lid connector 50 may be an external screw thread. Alternatively, the lid connector 50 may be a bayonet catch. It is clear that the carafe connector 188 may be an internal screw thread for the first embodiment or a complementary bayonet catch for the alternative embodiment.

In the example of the brew through lid 20 that is shown, the connection wall passages 60 are embodied as indentations in the cylindrical connection wall 46 that extend from a downward edge 72f the connection wall 46 to the liquid space 54. The plurality of indentations 60 are in the exemplary embodiment formed by four indentations 60 that are circumferentially spaced at equal distances. Such indentations 60 are advantageous from a manufacturing point of view in that they are releasable from a mould. By virtue of the circumferentially spaced pouring passages 56 and the circumferentially spaced connection wall passages 60 brew liquid may leave the internal reservoir 182 in any rotational position of the brew through lid 20 relative to the thermal carafe 18. Thus, the user does not have to carefully adjust the rotational position of the brew through lid 20 relative to the carafe 18.

The brew through lid 20 may include a handle 74 that is configured to engage the brew through lid 20 by hand. In the exemplary embodiment shown in the Figures, the handle 72 comprises two notches 72 that are positioned in a radially outward region of the cap top wall 42 at diametrically opposite sides of the cap top wall 42. In an alternative embodiment three or more notches 72 may be provided to form a handle. In a preferred embodiment, the relative circumferential position of the lid connector 50 and the two notches 72 is such that in a mounted condition of the brew through lid 20 on the thermal carafe 18, the two notches 72 are, viewed from above, on opposite sides of the pouring provision 186 of the carafe 18. In such a configuration it is prevented that the handle 72 is soiled by brew liquid that may, inadvertently, leave the internal liquid reservoir 182 via the brew inlet 44 when the internal reservoir 182 is completely filled and the user pivots the carafe 18 too much when starting to pour.

From a manufacturing point of view it is advantageous when the brew through lid 20 is a one piece casting of plastic. The plastic may for example be polypropylene.

Tests have been conducted to compare the temperature of the coffee in the thermal carafe 18 under varying conditions. Below table shows the temperature decrease for every five minutes ($1^{st}$ column) after finalization of the brewing cycle. The $2^{nd}$ and the $3^{rd}$ column show the temperature decrease in a test wherein a standard conventional isolating lid was placed on the thermal carafe five minutes after finalization of the brewing cycle. The $4^{th}$ and $5^{th}$ column show the temperature decrease in a test wherein a standard conventional isolating lid was placed on the carafe ten minutes after finalization of the brewing cycle. The $6^{th}$ and $7^{th}$ column show the temperature decrease in a test wherein a brew through lid 20 of the embodiment shown in FIGS. 4 and 5 is put on the thermal carafe 18 at the beginning of the brewing cycle.

Figure 6:
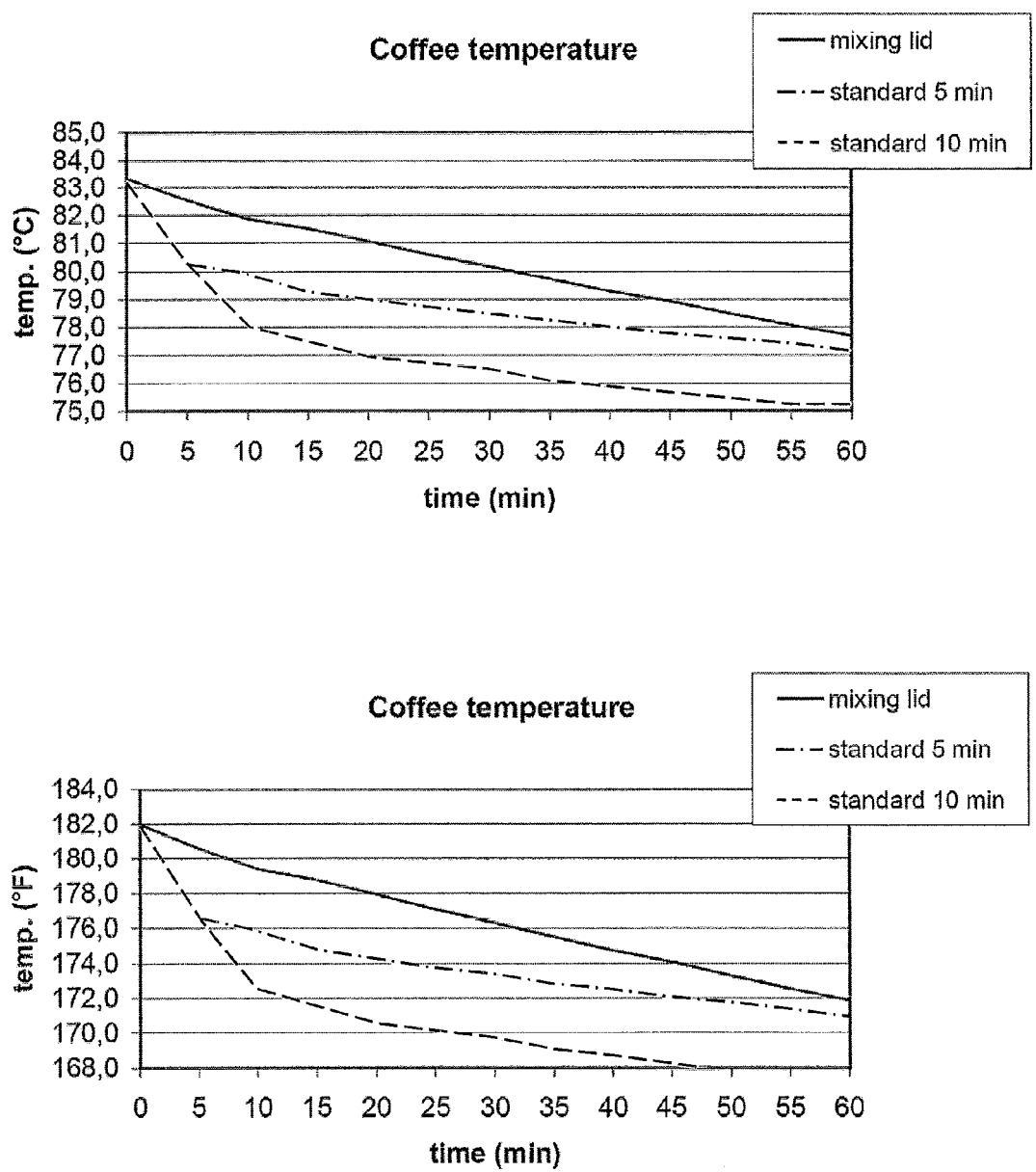
FIG. 6 shows two graphs of the coffee temperature decrease in the internal reservoir of a thermal carafe.

In order to obtain comparable liquid temperatures 60 minutes after finalization of the brewing cycle, the user has to monitor the brewing cycle and place the conventional isolating lid directly after the finalization of the brewing cycle on the thermal carafe. A graphical representation of the above table is provided in FIG. 6.

| | Coffee temperature vacuum flask | | | | | |
|---|---|---|---|---|---|---|
| | Standard lid | | | | | |
| time | after 5 minutes | | after 10 minutes | | Mixing lid | |
| (min.) | ° C. | ° F. | ° C. | ° F. | ° C. | ° F. |
| 0 | 83.3 | 181.9 | 83.3 | 181.9 | 83.3 | 182.0 |
| 5 | 80.3 | 176.5 | 80.3 | 176.5 | 82.5 | 180.6 |
| 10 | 79.9 | 175.8 | 78.1 | 172.5 | 81.9 | 179.4 |
| 15 | 79.3 | 174.7 | 77.5 | 171.5 | 81.5 | 178.8 |
| 20 | 79.0 | 174.2 | 76.9 | 170.5 | 81.1 | 177.9 |
| 25 | 78.7 | 173.7 | 76.7 | 170.1 | 80.6 | 177.1 |
| 30 | 78.5 | 173.3 | 76.5 | 169.7 | 80.2 | 176.3 |
| 35 | 78.2 | 172.8 | 76.1 | 169.0 | 79.7 | 175.5 |
| 40 | 78.0 | 172.5 | 75.9 | 163.6 | 79.3 | 174.7 |
| 45 | 77.8 | 172.0 | 75.7 | 168.2 | 78.9 | 174.1 |
| 50 | 77.6 | 171.7 | 75.4 | 167.8 | 78.5 | 173.3 |
| 55 | 77.4 | 171.4 | 76.3 | 167.5 | 78.1 | 172.5 |
| 60 | 77.2 | 170.9 | 75.3 | 167.5 | 77.7 | 171.9 |
| ΔT | 6.1 | 43.0 | 8.0 | 46.4 | 5.6 | 42.1 |

Although illustrative embodiments of the present invention have been described above, in part with reference to be accompanying drawings, it is to be understood that the invention is not limited to these embodiments. Variations to the disclosed embodiments can be understood and effected by those skilled in the art in practicing the claimed invention from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combined in any suitable manner to form new, not explicitly described embodiments.

The invention claimed is:

1. A brew through lid for a thermal carafe that has a pouring provision and an internal liquid reservoir with a height, the brew through lid comprising:
   a cap member including:
      a cap top wall that is cone shaped and having a concave side that is directed upwardly;
      a brew inlet in a centre of the cap top wall at a lowest part of the cone shaped cap top wall;
      a substantially cylindrical connection wall having a top edge that is connected to the cap top wall;
      a lid connector that is an integral part of the connection wall;
   a pouring skirt wall that is connected to the cap member and that has a substantially cylindrical configuration, the pouring skirt wall extending around an upper portion of the connection wall and radially spaced from the connection wall to define a liquid space between the connection wall and the pouring skirt wall,
   a plurality of pouring passages that are circumferentially spaced in the pouring skirt wall and that allow passage of brew liquid out of the liquid space;
   a flange that circumferentially extends around the connection wall having an inner edge that is connected with the connection wall and having an outer edge that is connected with the pouring skirt wall; and
   a plurality of connection wall passages that are circumferentially spaced in the cylindrical connection wall and that are configured to allow passage of brew liquid from the internal liquid reservoir of the carafe to the liquid space.

2. The brew through lid of claim 1, wherein the circumferentially spaced pouring passages are formed by crenels of a downwardly directed crenellated structure in the pouring skirt wall, neighbouring crenels being separated from each other by intermediate pouring skirt wall parts.

3. The brew through lid of claim 1, including:
   a mixing pipe having a top edge that is connected to a downwardly directed side of the cap top wall, the mixing pipe defining a mixing pipe channel having an inlet that is constituted by the brew inlet and having an outlet at a downward end of the mixing pipe.

4. The brew through lid according to claim 3, the mixing pipe having a length that is in the range of 0.5-0.9 of the liquid reservoir height.

5. The brew through lid according to claim 1, wherein the lid connector is an external screw thread.

6. The brew through lid according to claim 1, wherein the lid connector is a bayonet catch.

7. The brew through lid according to claim 1, wherein the plurality of connection wall passages is formed by a plurality of circumferentially spaced indentations in the cylindrical connection wall that extend from a downward edge of the connection wall to the liquid space.

8. The brew through lid according to claim 7, wherein the plurality of indentations include four indentations that are circumferentially spaced at equal distances.

9. The brew through lid according to claim 1, including:
   a handle configured to engage the brew through lid by hand.

10. The brew through lid according to claim 9, wherein the handle comprises two notches that are positioned in a radially outward region of the cap top wall at diametrically opposite sides of the cap top wall.

11. The brew through lid according to claim 10, the relative circumferential position of the lid connector and the two notches is such that in a mounted condition of the brew through lid on the thermal carafe, the two notches are, viewed from above, on opposite sides of the pouring provision.

12. The brew through lid according to claim 1, wherein the lid is a one piece casting of plastic.

13. An assembly of a thermal carafe and a brew through lid, the assembly comprising:
   a brew through lid that includes:
      a cap member including:
         a cap top wall that is cone shaped and having a concave side that is directed upwardly;
         a brew inlet in a centre of the cap top wall at a lowest part of the cone shaped cap top wall;
         a substantially cylindrical connection wall having a top edge that is connected to the cap top wall;
         a lid connector that is an integral part of the connection wall;
      a pouring skirt wall that is connected to the cap member and that has a substantially cylindrical configuration, the pouring skirt wall extending around an upper portion of the connection wall and radially spaced from the connection wall to define a liquid space between the connection wall and the pouring skirt wall,
      a plurality of pouring passages that are circumferentially spaced in the pouring skirt wall and that allow passage of brew liquid out of the liquid space;
      a flange that circumferentially extends around the connection wall having an inner edge that is connected with the connection wall and having an outer edge that is connected with the pouring skirt wall; and
      a plurality of connection wall passages that are circumferentially spaced in the cylindrical connection wall;
   a thermal carafe that includes:
      an internal liquid reservoir with a height;
      an entrance opening that gives access to the internal liquid reservoir;
      a pouring provision; and
      a carafe connector that is provided in the entrance opening and that is configured to co-operate with the lid connector to mount the brew through lid in the entrance opening,
   wherein the plurality of connection wall passages are configured to allow passage of brew liquid from the internal liquid reservoir of the carafe to the liquid space.

14. A coffee maker comprising:
   a housing;
   a water reservoir that is included in the housing;
   a brew basket that is connectable to or placeable on the housing and that has a brew outlet and is configured to hold a filter;

a conduit having an inlet opening that is connected to the water reservoir and having an outflow opening that is arranged above the brew basket;

a heating element that is arranged in the conduit at a level below the water reservoir; and an assembly of a thermal carafe and a brew through lid, wherein the brew through lid includes:

a cap member including:

a cap top wall that is cone shaped and having a concave side that is directed upwardly;

a brew inlet in a centre of the cap top wall at a lowest part of the cone shaped cap top wall;

a substantially cylindrical connection wall having a top edge that is connected to the cap top wall;

a lid connector that is an integral part of the connection wall;

a pouring skirt wall that is connected to the cap member and that has a substantially cylindrical configuration, the pouring skirt wall extending around an upper portion of the connection wall and radially spaced from the connection wall to define a liquid space between the connection wall and the pouring skirt wall, a plurality of pouring passages that are circumferentially spaced in the pouring skirt wall and that allow passage of brew liquid out of the liquid space;

a flange that circumferentially extends around the connection wall having an inner edge that is connected with the connection wall and having an outer edge that is connected with the pouring skirt wall; and a plurality of connection wall passages that are circumferentially spaced in the cylindrical connection wall;

wherein the thermal carafe includes:

an internal liquid reservoir with a height;

an entrance opening that gives access to the internal liquid reservoir;

a pouring provision; and a carafe connector that is provided in the entrance opening and that is configured to co-operate with the lid connector to mount the brew through lid in the entrance opening, wherein the plurality of connection wall passages are configured to allow passage of brew liquid from the internal liquid reservoir of the carafe to the liquid space, wherein the assembly of the thermal carafe and the brew through lid is positioned underneath the brew outlet of the brew basket.

\* \* \* \* \*